United States Patent [19]
Lucas

[11] 3,925,759
[45] Dec. 9, 1975

[54] AUXILIARY EMERGENCY WARNING LIGHT SYSTEM

[76] Inventor: David F. Lucas, 8003 Pine Lake Road, Columbia, S.C.

[22] Filed: May 3, 1974

[21] Appl. No.: 466,826

[52] U.S. Cl. .............................. 340/81 R; 340/81 R
[51] Int. Cl.² ........................................ B60Q 1/52
[58] Field of Search ............ 340/81 R, 83, 76, 81 F

[56] References Cited
UNITED STATES PATENTS

| | | | |
|---|---|---|---|
| 3,309,562 | 3/1967 | Schultz.............................. | 340/81 R |
| 3,325,784 | 6/1967 | Erdelitsch et al. ................ | 340/81 R |
| 3,425,034 | 1/1969 | Romanzi, Jr. et al............. | 340/74 X |
| 3,629,821 | 12/1971 | Dobbins............................ | 340/81 R |

*Primary Examiner*—Donald J. Yusko
*Attorney, Agent, or Firm*—John S. Roberts, Jr.

[57] ABSTRACT

An auxiliary emergency warning light system for use in conjunction with automotive vehicles which includes a first set of high intensity warning lamps comprising a pair of laterally spaced lamps viewable from the front of the vehicle, a second set of high intensity warning lamps comprising a pair of laterally spaced red lamps viewable from the rear of the vehicle and a third set of high intensity warning lamps comprising a pair of laterally spaced amber lamps viewable from the rear of the vehicle and control means for actuating the sets of lamps to produce at least four signaling indications, namely: a first indication in which the front and the red rear warning lamps flash on and off, a second indication in which the front and the amber rear warning lamps flash on and off, a third indication in which the front warning lamps flash on and off and the rear red and amber lamps flash on and off alternately and a fourth signaling indication in which all the warning lamps are continuously illuminated.

5 Claims, 10 Drawing Figures

FIG. 1

THE CIRCUIT ARRANGEMENT OF THE AUXILIARY EMERGENCY-WARNING LIGHT SYSTEM

*FIG. 2*

ONLY RED LAMPS 20 FLASH ON & OFF CIRCUIT SWITCH-1 CLOSED FRONT LAMPS 15 & 16 FLASH ON & OFF

*FIG. 3*

ONLY AMBER LAMPS 19 FLASH ON & OFF CIRCUIT SWITCH-2 CLOSED FRONT LAMPS 15 & 16 FLASH ON & OFF

*FIG. 4*

RED-20 & AMBER-19 LAMPS ALTERNATE ON & OFF CIRCUIT SWITCH 3A & B CLOSED FRONT LAMPS 15 & 16 FLASH ON & OFF

*FIG. 5*

RED-20 & AMBER-19 LAMPS ON CONSTANT CIRCUIT SWITCH-8 CLOSED FRONT LAMPS-15 & 16 ON CONSTANT

AUXILIARY EMERGENCY WARNING LIGHT SYSTEM

BACKGROUND OF THE INVENTION

The present invention relates broadly to the art of electrical signaling. More particularly this invention relates to a signaling system for use on motor vehicles and is specifically directed to an auxiliary emergency warning light system.

The volume of traffic and the speed of motor vehicles on highways today are such that the safety value of using in every situation, warning signals now present on vehicles (red warning lights flashing on or off) is neutralized due to the confusion created by the absence of a system which will properly label the purpose of an intended signal being flashed from a vehicle and issue the necessary advance warning of a situation so as to allow it to be properly identified by following traffic. Confusion can not help but be generated when the driver of a following vehicle always identifies the same warning signal in every situation without knowing the position of, or the intent of the vehicle flashing such warning.

Vehicles now flashing a warning signal can be:

1. Stopped off the traffic portion of a highway causing no interruption with moving traffic, either on a routine stop, an emergency stop or properly parked.
2. Moving in the traffic portion of a highway, either at a reduced speed so as to interfere with the flow of other moving traffic or at normal speed with flashing lights in lieu of faulty tail lights.
3. Vehicle is at a stop in the traffic portion of a highway producing an emergency stopping or movement situation for the following traffic if a collision is to be avoided.

The tolerance for correct judgement in today's flow of traffic is such that when more than one different interpretation of a signal produces more than one different response, a conflict in traffic occurs; resulting in a possible loss of control or a collision with other moving traffic due to the inability to adjust to sudden, unnecessary responses from said moving traffic created by the confusion from the absence of a positive warning signal that will give an advance warning that can be interpreted in the manner intended.

A vivid example of this type highway confusion could be readily seen if present vehicles flashed both rear lights for either a turning movement or for braking. Following traffic would not know if the vehicle ahead is making a left turn, a right turn, or is applying brakes to stop, thus causing different responses from different drivers.

The proper driver response to a warning signal is for every driver to make the same necessary adjustments in speed or direction without interfering with following and passing traffic such as:

1. Bringing the vehicle to a stop without loss of control or collision with any other vehicle and issue a warning to following traffic preventing other collisions.
2. Reduce speed without interfering with following traffic causing a sudden braking or swerving movement to avoid a collision.
3. Lane change movement without interruption of the flow of traffic in other lanes.

The improper driver response is a different or unnecessary sudden change in speed or direction causing a conflict in the movement of following and passing traffic resulting in further accident producing situations created from confusion that is impossible to allow for without interfering with the flow of traffic in so doing.

The prior art is replete with vehicle signal arrangements which are actuated in response to brake pedal actuation, impact or collision or other conditions. U.S. Pat. No. 3,493,924 dated Feb. 3, 1970 and U.S. Pat. No. 3,629,821 dated Dec. 21, 1971 both to Hugh L. Dobbins disclose visual distress signaling systems on automotive vehicles embodying flashing blue and green lights. The system is operator controlled and is intended to indicate a primary distress signal, with both lights flashing, an acknowledgement of another's primary distress signal, with one light flashing, and as a secondary distress signal with the other light flashing to guide a rescue vehicle to the site.

However, the prior art does not provide an auxiliary emergency warning system that will improve highway safety by providing the proper necessary warning of a particular situation far in advance so that approaching traffic will have the necessary notice to enable a proper driving response, thereby eliminating unnecessary confusion created accidents.

STATEMENT OF THE INVENTION

Accordingly, the auxiliary emergency warning system of the invention provides warning light circuits on a vehicle embodying red and amber rear warning lights and high intensity front warning lights that will label and identify each highway situation requiring a warning signal.

Specifically, the invention provides an arrangement that will allow a signal to be issued in one of the four following combinations:

1. Only rear red warning lights and front high intensity warning lights flash on and off.
2. Only rear amber warning lights and front high intensity warning lights flash on and off.
3. Both the rear red and amber warning lights flash on and off in alternating sequence and front high intensity warning lights flash on and off.
4. All warning lights, front high intensity warning lights and rear red and amber warning lights, provide constant illumination.

By separating these lights, the driver of a vehicle can give a proper warning for each individual situation instead of using the present warning lights on a vehicle, they being only red warning lights flashing on and off notifying every situation.

The invention particularly provides a system including a circuit separation arrangement for two sets of rear warning lamps or lights operating in conjunction with front warning lamps or lights plus a positive parking light arrangement which disallows the use of the normal tail lights for parking indications or the use of normal parking lights for driving purposes.

For such a system to be effective, every driver of a vehicle has to be able to operate and distinguish these signals. To achieve these means the method devised must be:

1. Simple to operate.
2. Comply with laws and regulations.
3. Involve minimum maintenance and upkeep in order for every unit to stay in operating condition.
4. Employ a low initial cost to encourage maximum use, both from the consumer and manufacturer's viewpoint. The Auxiliary Emergency Warning light system of the invention will meet all these requirements.

State and Federal laws on motor vehicles require that signal lights on the rear of a vehicle to be red or amber colored. Many vehicles are now using either color for the purpose of giving one signal for every situation. The Emergency Warning Light System of this invention will comply with lawful requirements and be able to give a signal for each warning situation.

Vehicle inspections now reveal that faulty lights account for the majority of safety deficiencies. Present warning lights will add additional confusion should one light be out allowing approaching traffic to falsely identify signal to be for a turning movement. The Auxiliary Emergency Warning Light System of the invention allows critical warnings to be identified should a single light go out without giving a false interpretation.

By a simple manual control of these warning signals, a driver will be able to give a desired signal without taking his eyes off the road. This system will require no additional maintenance or repairs over that of present warning signals on vehicles. These signals will not interfer with the design of present or future vehicles as said system can be installed with a simple modification of the rear lights and lens now in use.

The warning signals, their purpose and proper response of the Auxiliary Emergency Warning Light System of the invention are as follows:

A. Vehicle parked off traffic portion of highway in emergency lane with no aid needed.

All warning lights, front high intensity lights and rear red and amber lights actuated to provide constant illumination. In this situation, a vehicle will automatically activate the aforesaid proper signal, a constant high intensity parking light on the front and rear of a vehicle, when the parking brake is applied. This signal will eliminate a confusing flashing signal now being used which serves no purpose for a vehicle stopped off the highway when the driver is just making a routine stop and other means of lighting are just as effective. The red and amber rear warning lights, with simultaneous and constant illumination produce a bright orange intensity that will provide ample means of being identified from the rear and will confirm its intended signal as being stopped off the highway and not conflicting with the flow of moving traffic. The front of the car will also have ample identification from constant illumination of both warning lights in high intensity for other parking situations.

The ignition switch will cancel lights when a signal is not needed when the parking brakes are applied. With the addition of this parking light, a vehicle can now be arranged so the tail lights will illuminate only with the head lamps, eliminating the hazzard of vehicles being operated in adverse or in low visibility conditions with present low intensity parking lights as its means of being seen, which is not ample lighting for these conditions when outside mirrors and windows become obstructed from rain, fog, or ice causing a driver to lose his side and rear vision of vehicles failing to use headlights in moving traffic. The absence of flashing lights in a non-emergency situation will eliminate a false confusing interpretation from being unnecessarily created.

Improper response will be eliminated by moving traffic knowing this vehicle is out of the highway and sudden braking or movement is not necessary.

B. Vehicle moving in traffic lane of highway.

The rear red warning lights and front high intensity warning lights are actuated to flash on and off. A vehicle moving under minimum speed or at a reduced rate of speed due to adverse conditions or unusual situations can give a proper signal for this hazzard. When only the red warning lights flash on and off from the rear of a vehicle it provides a positive means for other moving, especially following, traffic to identify its presence, labeling both its position and reduced rate of speed, alerting following drivers and eliminates the confusion created by not being able to known which one of several situations may be present. This signal is now being used by many vehicles and is a traffic law in many states when vehicle speed falls below the minimum limit. In its present form, this signal both alerts and confuses other moving traffic as this is now the only warning signal issued by vehicles; it is impossible to known what it is intended to warn of until it is often too late to apply the correct response without loss of control or collision with other moving traffic.

In blinding fog the intensity of flashing lights allows a vehicle to be visible much easier by following traffic, but without a system for the use of the warning lights, a driver in a following vehicle when he first sees these flashing lights is confused as to the position, situation, and intention of a vehicle ahead. He does not want to make a sudden unnecessary stop with the possibility of being hit in the rear by a vehicle behind him or failing to make the necessary allowance to avoid a collision if vehicle ahead of him is stopped in the highway. In either event, an accident producing situation is present that triggers many multi-car collisions without a proper signal that can label this situation so the correct response can be applied by identifying a warning situation in advance.

The proper response can be applied by knowing that the vehicle ahead is moving at a reduced rate of speed allowing time for a lane change to pass or the adjusting of speed to eliminate overrunning a slow moving vehicle until it is safe to pass.

C. Vehicle stopped in traffic portion of highway.

The rear red and amber warning lights are actuated to flash on and off in alternating sequence and the front high intensity warning lights are actuated to flash on and off. With the rear red and amber lights flashing on and off in alternating sequence, it will so distinguish itself from other signals and alert on-coming traffic of the worse possible situation, that being a vehicle is stopped in the traffic portion of the highway ahead and a collision is imminent unless the proper response is applied immediately. It is a driver's responsibility when stopped in the highway to warn approaching moving traffic and avoid other collisions. With the absence of a proper signal, drivers now know present signal will not issue a positive warning of this situation, thus requiring getting out of a vehicle and running back down the road waving their hands and arms to hopefully prevent other collision. The necessity of waving the arms for a warning signal of a highway situation today is as ancient as the arm and hand signals would be to signal a turn or stop. Proper response to this signal will eliminate a reason to falsely assume and not being able to stop, because a following driver will have the positive advanced warning that the vehicle ahead is stopped and is also in the traffic lane of the highway, thus preventing himself from being involved in an accident by not losing control of his vehicle or overrunning a stopped vehicle from a lag in the time element necessary to stop his vehicle, which would occur if confusion created a hesitation in applying the necessary immediate corrective response when a signal was first seen.

The proper response for this signal is to come to a safe stop as soon as possible and issue the same warning signal to vehicles following so they can also apply the correct response.

D. Vehicle stopped in emergency lane with aid needed.

The rear amber lights and front high intensity warning lights are actuated to flash on and off. A vehicle stopped in the emergency lane or off the traffic portion of a highway when driver needs aid or assistance can give a proper signal for this situation. When only the amber warning lights flash on and off from the rear of a vehicle, it provides ample means for passing motorist to recognize a need for aid far enough in advance to safely stop behind a vehicle issuing this signal, thus eliminating the need for a long walk back or unlawful backing up checking to see if aid is needed by a stopped vehicle. An insufficient signal, such as a handkerchief attached to the vehicle, is not sufficient in daylight and impossible at night to recognize in advance without causing a conflict in moving traffic, when and if a response should be made. This makes many situations that could be hastily remedied a disaster for someone unable to get aid. Sickness can strike at any moment. A driver taken ill while driving endangers numerous persons by trying to reach help instead of help reaching him; this is what a driver now has to do for fear of no one stopping to help him if he pulls off the highway and is unable to signal for help. This signal has value if never used, that being a form of assurance that aid can be safely summoned if it should ever become necessary. After a person has received help, this signal can be cancelled and the proper parking signal applied.

The proper response for this signal requires no sudden braking or movement other than that a vehicle responding to aid some one should do so safely without interfering with the flow of moving traffic.

E. Vehicle moving in traffic lane of highway — driver needs help.

The rear amber lights and the front high intensity warning lights are actuated to flash on and off. With a proper signal, the rear amber lights flashing on and off, a driver can summon for help while operating a vehicle. This signal would benefit highway safety by giving many drivers peace of mind in knowing that they have a positive way of signaling for help should it be needed. This peace of mind will allow a driver to concentrate on his driving instead of fearing a possible emergency situation; just as the telephone provides security in the home when someone is alone and possible trouble exists. By this signal being part of a vehicle, it will discourage a lot of crime such as dangerous hitch-hikers or someone making a forced entry when a means of escape is needed or the high-jacking of a vehicle in operation. This signal will alert police of a dangerous situation and how to best apprehend this vehicle without endangering the safety of others. In present form, many drivers will violate a law intentionally to gain attention when help is needed. This tactic is an ambush for the police who stop and have to approach this vehicle without knowing the driver is trying to get help and the criminal not knowing why the car has been stopped.

Responding to this signal from a vehicle moving in traffic is to report this situation and not try to handle it alone.

Further specific objects and advantages of the invention will be readily apparent from the following description when taken in connection with the accompanying drawings.

DETAILED DESCRIPTION OF A PREFERRED EMBODIMENT

Figure 1:
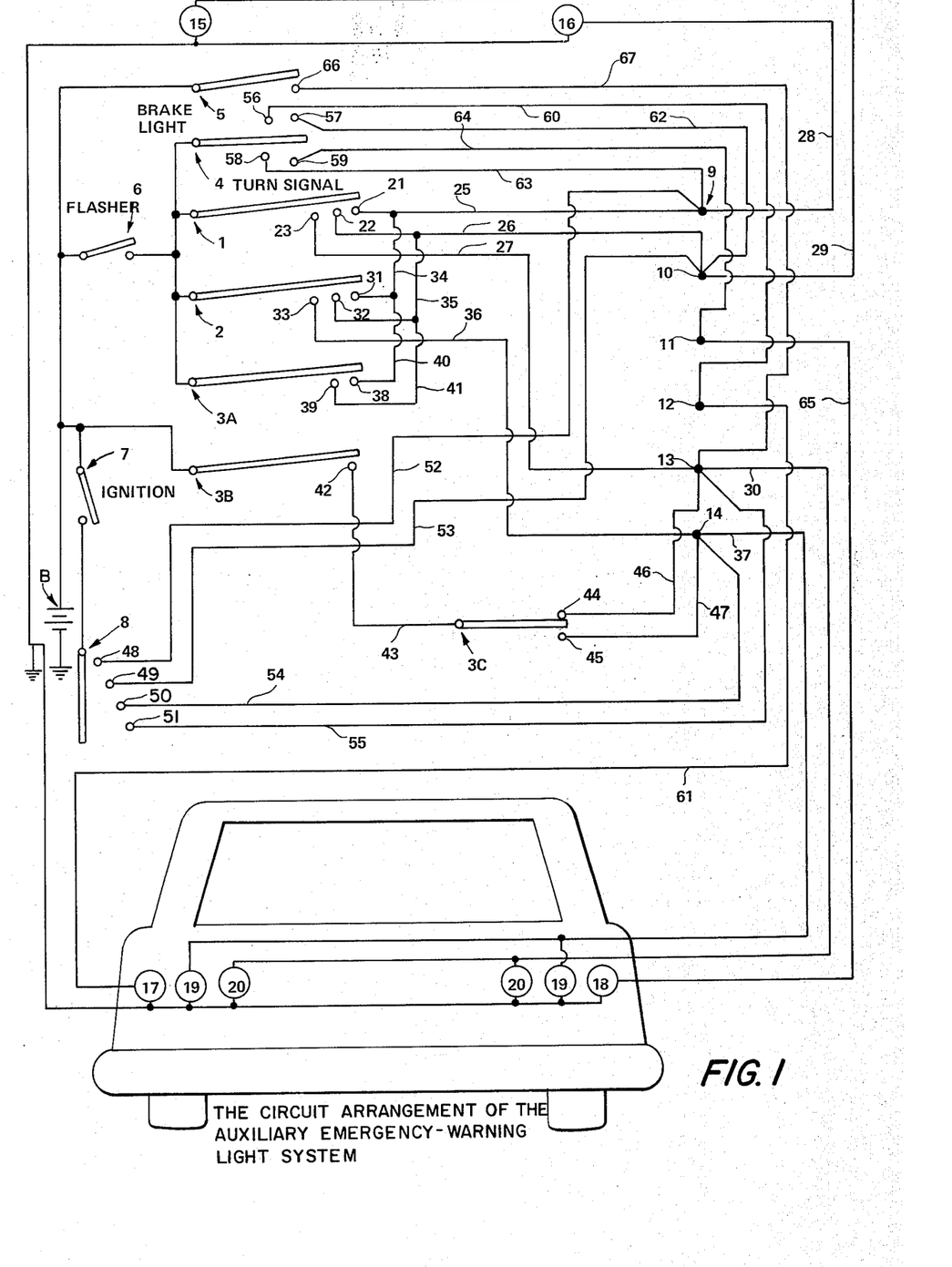
FIG. 1 is a schematic view illustrating the auxiliary emergency warning light system of the invention, FIGS. 2 to 5 diagrammatically illustrate the four principal modes of operation of the system of the invention.

While the schematic illustration in FIG. 1 indicates the system as applied to a pleasure motor vehicle, it is to be emphasized that the warning system of the invention is for use on all road vehicles, especially trucks, tractor-trailer combinations and buses since these being commercial vehicles are more apt to require a uniform system of emergency warning lights.

In FIG. 1 the vehicle storage battery B supplies a constant source of current to open circuit controllers 3B, 5, 6 and 7. Circuit control 6 is a flasher which when closed converts the constant or direct current from the battery into pulsating current (pulsing voltage) to supply the input side of circuit controllers 1, 2, 3A and 4 which in a circuit closing condition will cause the associated lights to flash on and off. The four modes of operating the emergency warning light system of the invention are manually controlled by circuit controllers or switches 1, 2, 3A and 3B jointly and 8.

Flasher devices are conventional and can be of the type shown in U.S. Pat. No. 2,761,931 to Schmidinger, or U.S. Pat. Nos. 3,225,165 and 3,225,166 to Blerweiss, the disclosures of which are incorporated herein by reference.

The lights to be controlled are the high intensity front signal or warning lights 15 and 16. The rear signal lights 17 and 18, the rear amber warning lights 19 and the rear red warning lights 20.

Figure 2:
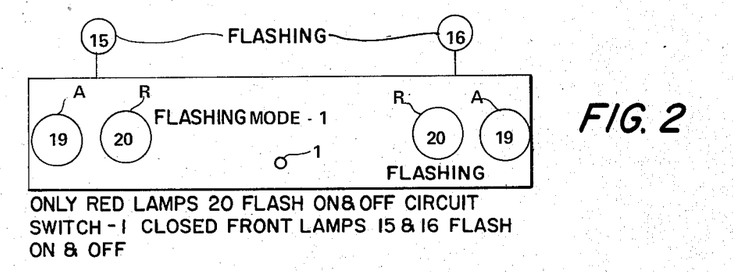

The four main modes of actuating the warning lights of the system of the invention are diagrammatically illustrated in FIGS. 2 to 5. FIG. 2 indicates that upon actuating switch 1 the rear red warning lights 20 flash on and off and the front high intensity warning lights 15 and 16 also flash on and off. This mode being utilized in situation B supra, i.e. with the vehicle moving in the traffic lane of a highway.

Figure 3:
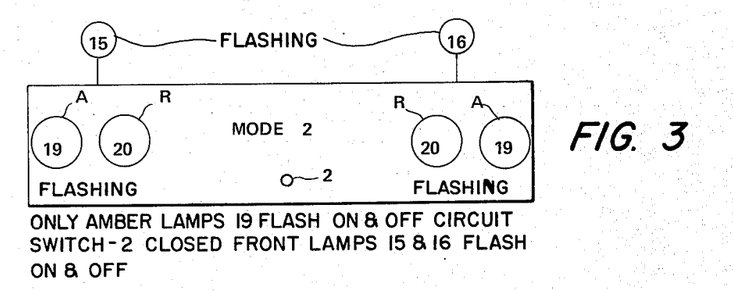

In FIG. 3 with switch 2 actuated the rear amber warning lights 19 flash on and off and the front high intensity warning lights also flash on and off. This mode is utilized in both situations D and E supra, i.e. with the vehicle stopped in an emergency lane with aid needed and also with the vehicle moving in a traffic lane and the driver needs help.

Figure 4:
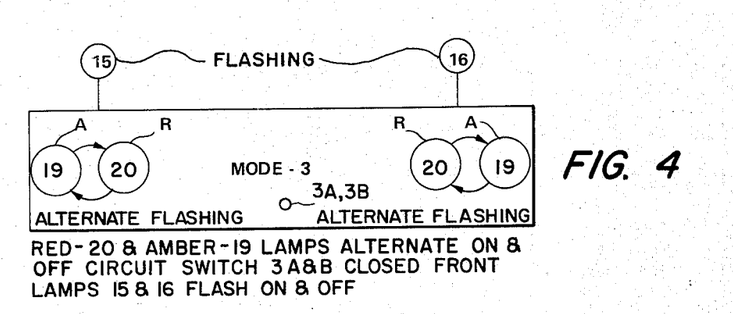

In FIG. 4 with switch means 3A, 3B closed the amber and red rear warning lights 19 and 20 flash on and off alternately and the front high intensity warning lights 15 and 16 also flash on and off. This mode is utilized in situation C supra, i.e. with the vehicle stopped in the traffic portion of a highway.

Figure 5:
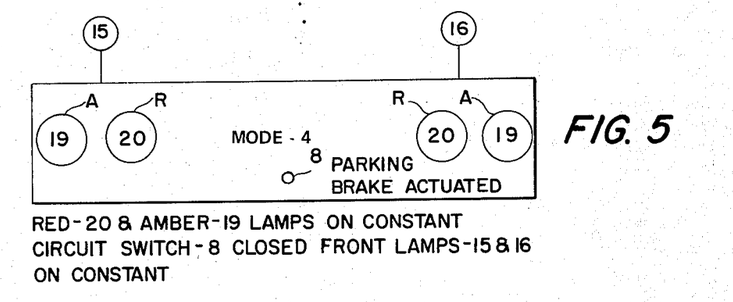

FIG. 5 indicates that when switch 8 is closed responsive to actuation of the vehicles parking brake all the warning lights, amber and red rear lights 19 and 20 and the high intensity front warning lights 15 and 16 are steadily or constantly illuminated as long as the ignition switch 7 is closed. This mode is utilized in situation A supra, i.e. with the vehicle parked off the traffic portion of the highway in an emergency lane with no aid needed.

Thus, as indicated in FIG. 1 with flasher 6 closed, closing of switch 1, with switches 2, 3A and 3B open, sends pulsing current via contacts 21, 22 and 23 over wires 25, 26 and 27, to junctions 9, 10 and 13 respectively. The current flows from junction 9 over wire 28 to right front high intensity warning light 16, from junction 10 over wire 29 to left front warning light 15 and from junction 13 over wire 30 to both rear red warning lights 20 so that all of these lights flash on and off.

When switch 2 is closed with switches 1, 3A and 3B open pulsing current flows via contacts 31, 32 and 33 over wires 34, 35 and 25 to junction 9, wires 35 and 26 to junction 10 and wire 36 to junction 14. The current flows from junctions 9 and 10 over wires 28 and 29 cause the front high intensity warning lights 15 and 16 to flash on and off. The current flows from junction 14 over wire 37 to both rear amber warning lights which also flash on and off.

With switches 1 and 2 open upon simultaneous closing of switches 3A and 3B, switch 3A when closed sends pulsing current via contact 38 over wires 40, 34 and 25 to junction 9 and thence via wire 28 to light 16 and via contact 39 over wires 41, 35 and 26 to junction 10 and thence via wire 29 to light 15 so that both front lights flash on and off. Switch 3B when closed sends constant current via contact 42 and wire 43 to alternating flasher 3C which alternately closes and opens contacts 44 and 45 supplying current via wires 46 and 47 to junctions 13 and 14 and thence via wires 30 and 37 to the rear red and amber warning lights so that they flash on and off alternately. Thus all warning lights are flashing on and off.

With switches 1, 2, and 3A and 3B opened the actuation of the vehicle's parking brake closes switch 8. The input contact of this switch receives constant current with ignition switch 7 closed so that closing of switch 8 sends constant current over contacts 48, 49, 50 and 51 and wires 52, 53, 54 and 55 to junctions 9, 10, 14 and 13 respectively and thence via wires 28, 29, 37 and 30 to lights 16, 15, 19 and 20 respectively so that all warning lights are constantly illuminated.

FIG. 1 also discloses one arrangement of turn signal and brake light circuitry incorporated into the emergency warning light system of the invention. Thus, turn signal switch 4 receives pulsing current from flasher 6 and has output contacts 56 and 57 contacted upon a left turn and output contacts 58 and 59 which are contacted upon a right turn. Upon a left turn pulsing current flows from contact 56 over wire 60 to junction 12 and thence over wire 61 to left rear turn light 17 and also from contact 57 over wire 62 to junction 10 and thence over wire 29 to left front warning light 15 so that both of lights 17 and 15 flash on and off. Upon a right turn pulsing current flows from contact 58 over wire 63 to junction 9 and thence over wire 28 to right warning light 16 and from contact 59 over wire 64 to junction 11 and thence over wire 65 to right rear turn light 18 so that both of lights 16 and 18 flash on and off. Thus the turn signals can operate in addition to the circuits controlled by switches 1, 2, 3A and 3B and 5 as needed.

Switch 5 is a brake light switch of conventional nature, i.e. actuated by the brake pedal which supplies constant current when closed over contact 66 and wire 67 to junction 13 and thence over wire 30 to both rear red warning lights 20. This allows a constant flow of current from switch 5 to overrule pulsing current from circuit controllers 1 and alternating flasher 3C at junction 13.

The details of the switch actuating means for switch means 1, 2, and jointly operated switch means 3A and 3B are not shown since any conventional push button or rotary type actuators can be utilized.

FIGS. 6 to 10 schematically and diagrammatically illustrate a single manually actuated control for effecting the flashing of the lights or lamps of the system of the invention. Basically, the control comprises a knob operated rotatable cam shaft CS having a series of axially arranged cams thereon. These cams comprise two three lobed cams AA' and EE' and three single lobed cams BB', CC' and DD' arranged as indicated. The cam shaft and its associated cams are arranged in a dashboard mounted housing, not shown, with the control knob K within easy reach of the driver of a vehicle. The knob K bears four indications, namely "off", P1, P2 and P3 displaced 90° from each other as shown in FIGS. 7 to 10. The respective cams control the circuits AA, BB, CC, DD and EE by closing the same by moving the associated movable contacts 85, 104, 107, 111 and 73 thereof as set forth hereafter.

The shaded lobes in FIGS. 7 to 10 indicate the respective circuit closing cam lobes for the various knob positions.

Figure 6:
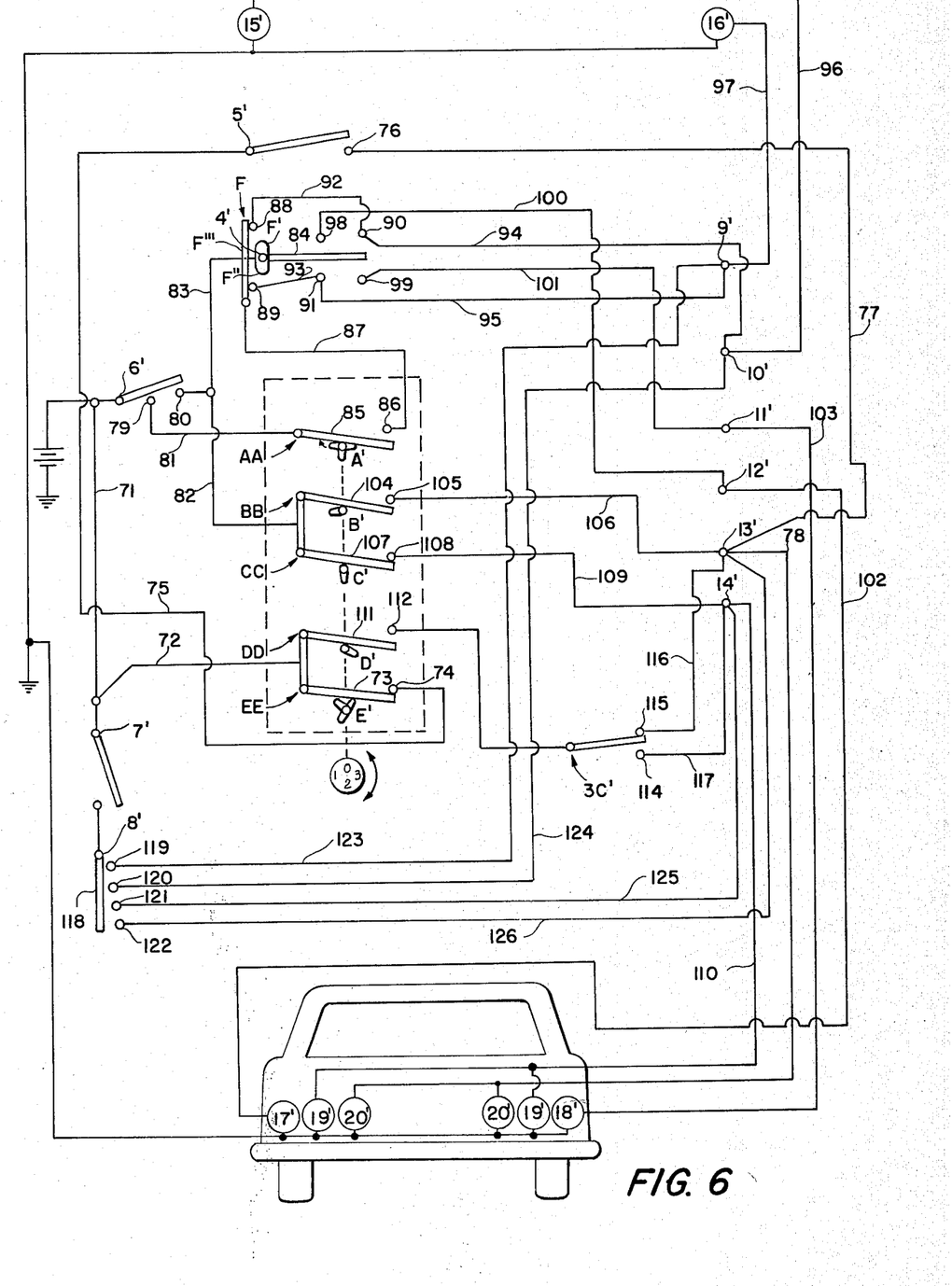
FIG. 6 is a schematic view illustrating a modified form of the auxiliary emergency warning light system of the invention.
Figure 7:
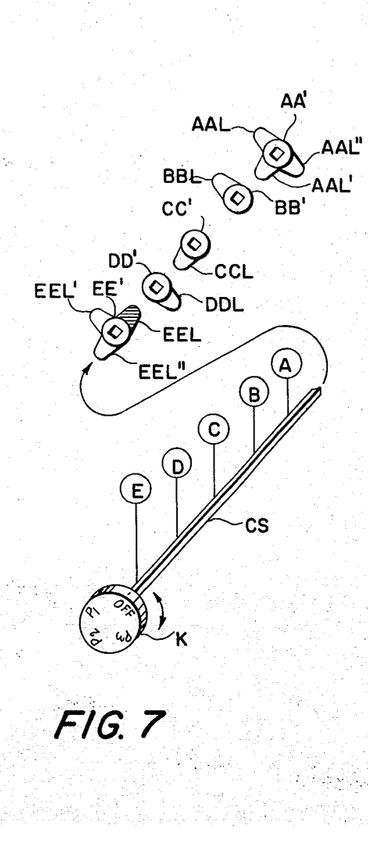
FIGS. 7 to 9 are exploded perspective views illustrating the switch control shaft and the cam arrangement thereon for use in the form of invention shown in FIG. 6 and respectively illustrating the cam positions in the "off" position and in the positions for modes of operation shown in FIGS. 2, 3 and 4.

In FIG. 7 only lobe EEL of cam EE' is active to close circuit EE of FIG. 6 to control the supply of constant current to the input side of the vehicle's brake light switch which allows the actuation of the brake lights.

Figure 8:
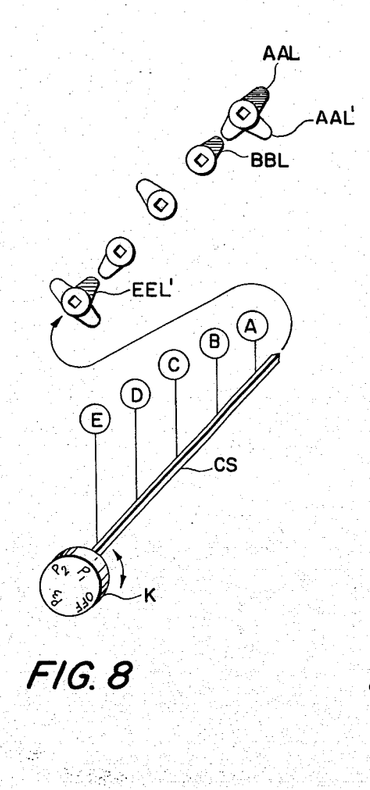

Upon turning knob K from the off position one quarter turn to the right to position P1, FIG. 8, lobe AAL of cam AA'; lobe BBL of cam BB' and lobe EEL' of cam EE' become active to close circuits AA, BB and EE respectively to cause the rear red lights or lamps and the front warning lights or lamps to flash on and off to provide the indication required by situation B supra, i.e., with the vehicle moving in the traffic lane of a highway. When this signal is no longer required the knob K is turned back to the off position.

Figure 9:
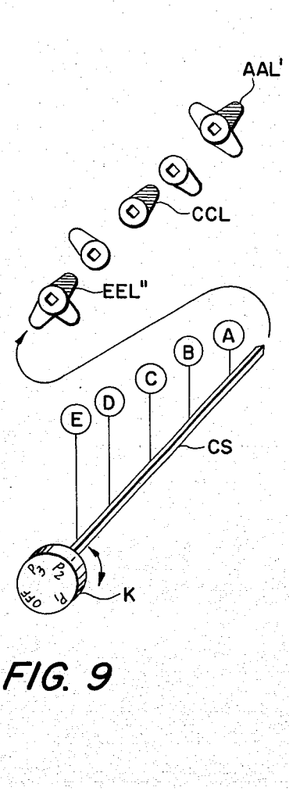

FIG. 9 indicates that when a signal is required for situations D and E supra, i.e. with the vehicle stopped in an emergency lane with aid needed and the parking brake not applied and also with the vehicle moving in a traffic lane and the driver needs help, the knob K is turned from the off position one half turn to the right to position P2 lobes AAL' of cam AA', lobe CCL of cam CC' and lobe EEL" of cam EE' become active to close circuits AA, CC and EE to cause the rear amber lights and the front warning lights to flash on and off. The knob K is returned to the "off" position when either of these signals is no longer needed.

Figure 10:
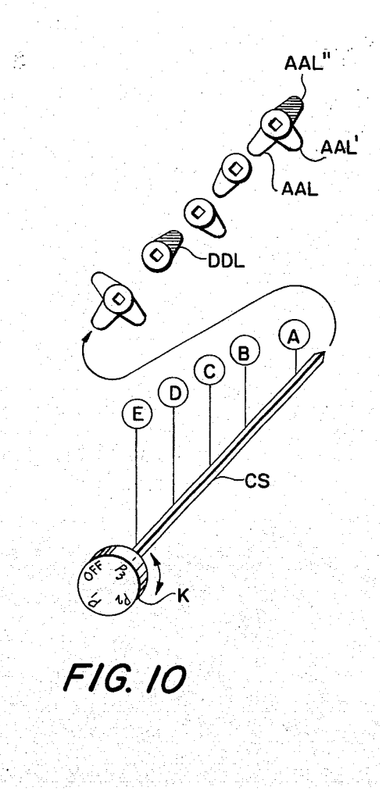

To effect the mode of operation utilized in situation C supra, i.e. with the vehicle stopped in the traffic portion of the highway the knob K is turned from the off position three quarters of a turn to the right, FIG. 10, to position P3 so that lobe AAL" of cam AA' and lobe DDL of cam DD' become active to close circuits AA and DD to cause the front warning lights to flash on and off and the amber and red rear warning lights to flash on and off alternatively.

FIG. 6 illustrates a modified circuitry for effecting the emergency warning signals of the invention. In this arrangement the vehicle storage battery supplies a constant source of current to open circuit controllers 6', a flasher, the open ignition switch 7' over lines 71, 72 to the tied together inputs of circuits DD and EE controlled by cams DD' and EE' which in the off position of FIGS. 6 and 7 has closed circuit EE by moving the movable contact 73 into closed position. Constant current thus flows from fixed contact 74 over wire 75 to the input side of brake light switch 5'. Due to the cam arrangement on the cam shaft, the brake lights, which are the high intensity rear red warning lights 20, can be actuated with the cam shaft in the off position or in positions P1 and P2 but not in position P3. When the brake switch is closed, current flows from the output contact 76 over wire 77 to junction 13' and thence over wire 78 to the rear red lights 20'. This arrangement eliminates constant current overruling pulsing current at junction 13'.

The pulsing current from the output contacts 79 and 80 of flasher 6' flows respectively to the input side of circuit AA over wire 81 and to the tied together inputs of circuits BB and CC over wire 82. This current also flows to the input side of turn signal switch 4' over line 83. The movable contact 84 of this switch is shown in the neutral position. Circuit AA when its movable contact 85 is closed by cam AA' in knob positions P1, P2, and P3 supplies pulsing current from output contact 86 over wire 87 to the input side of normally closed circuit F, the output contacts 88 and 89 which supply such current to output contacts 90 and 91 over wires 92 and 93 and thence over wires 94 and 95 to junctions 10' and 9' respectively and to the front lamps 15' and 16', via wires 96 and 97 respectively.

When a turn signal is to be issued the movement of its control lever will displace the movable contact 84 either up or down depending upon a left or right turn indication. This movement will open circuit F by reason of, for example, the action of either of cams F' or F" against the movable contact F''' completing a circuit with the output contacts 90 or 91 and output contacts 98 and 99 depending upon the turn indication desired. The pulsing current flows from contact 98 over wire 100 to junction 12' and thence over wire 102 to the rear left turn indicating light 17' or from contact 99 over wire 101 to junction 11' and thence over wire 103 to the rear right turn indicating light 18'. The pulsing current from contacts 90 or 91 flows to the left front light 15' or the right front light 16' as indicated above.

Circuit BB includes the movable contact 104 which is closed by cam BB' in knob position P1 and sends pulsing current from output contact 105 over wire 106 to junction 13' and thence over wire 78 to the rear red warning lights 20'.

Circuit CC includes the movable contact 107 which is closed by cam CC' in knob position P2 to cause pulsing current to flow from output contact 108 over wire 109 to junction 14' and thence over wire 110 to the rear amber warning lights 19'.

Circuit DD includes the movable contact 111 which is closed by cam DD' in knob position P3 to supply constant current over output contact 112 and line 113 to the input side of alternating flasher 3C' which alternately closes and opens contacts 114 and 115 supplying current via wires 116 and 117 to junctions 13' and 14' and thence via wires 78 and 110 to the rear red and amber warning lights so that they flash on and off alternately.

The circuitry for the indication of situation A, supra is substantially the same as in FIG. 1. Thus, upon actuation of the parking brake of the vehicle the movable input contact 118 of switch 8' receives constant current, with ignition switch 7' closes so that upon engaging output contacts 119, 120, 121 and 122 such current flows over wires 123, 124, 125 and 126 to junctions 9', 10', 14' and 13', respectively and thence via wires 97, 96, 110 and 78 to lights 16', 15', 19' and 20' respectively so that all the warning lights or lamps are constantly illuminated.

Further, in connection with the invention all the lamps are of high intensity and the possible head light and tail light arrangements are not shown. The front signal lamps can be amber colored or white as desired, or as required by any legislation.

While amber and red are preferred as the colors for the rear warning lamps it is to be understood that the color of these lamps can be changed to meet any legislative requirements.

Also while the preferred mode of operation contemplates the particular flashing arrangement described the circuitry could be modified to provide, in position P3, that the front lamps flash on and off alternately or if desired all warning lamps could be arranged to merely flash on and off.

What is claimed is:

1. An auxiliary emergency warning light system for a motor vehicle comprising
    a first set of signaling lamps comprising a pair of laterally spaced high intensity lamps producing light of a first color which is visible from the front of said vehicle,
    a second set of signaling lamps comprising a pair of laterally spaced high intensity lamps producing light of a second color which is visible from the rear of said vehicle,
    a third set of signaling lamps comprising a pair of laterally spaced high intensity lamps producing light of a third color which is visible from the rear of said vehicle,
    control means embodied with said vehicle for causing said lamps to produce a plurality of signals comprising at least a first signal comprising the flashing of the lamps of said first and second sets, a second signal comprising the flashing of the lamps of said first and third sets and a third signal comprising the flashing of the lamps of said first set and the flashing of the lamps of the second and third sets alternately, and said system
    further including a pair of laterally spaced high intensity turn signal indicating lamps visible from the rear of said vehicle, and said control means including a vehicle turn actuated switch means for alternately electrically connecting said first flasher means to one of the lamps of said first set and that one of the lamps of said set of turn signal indicating lamps positioned on the same side of the longitudinal axis of the vehicle to cause said lamps to flash according to the direction of turning of the vehicle.

2. An auxiliary emergency warning system for a motor vehicle as claimed in claim 1 and said control means including means operative in response to the actuation of the vehicle's parking brake to cause said lamps to produce a fourth signal comprising the constant illumination of the lamps of all three sets.

3. An auxiliary emergency warning system for a motor vehicle as claimed in claim 1 wherein said control means includes a first flasher means for producing a pulsing voltage output, means electrically connecting said first flasher means to a source of electrical potential, first switch means for electrically connecting said first flasher means to the lamps of said first and second sets to cause said lamps in said sets to flash, second switch means for electrically connecting said first flasher means to the lamps of said first and third sets to cause said lamps in said sets to flash, jointly operable third switch means including a switch means for electrically connecting said first flasher means to the lamps of said first set to cause said lamps in said set to flash, said third switch means including another switch means electrically connected to said source of electrical potential, and a second flasher means electrically connected between said another switch means and the lamps of said second and third sets to cause both lamps in each of said second and third sets to flash alternately.

4. An auxiliary emergency warning system for a motor vehicle as claimed in claim 1 wherein said control means further includes an ignition switch, means for electrically connecting said ignition switch to said source of electrical potential, further switch means operable to closed condition in response to actuation of the vehicle's parking brake, means electrically connecting said further switch means to said ignition switch to receive current from said source of electrical potential when said ignition switch is in closed condition and means for electrically connecting said further switch means when in closed condition to the lamps of said first, second and third sets to cause all the lamps of said sets to light as long as said ignition switch means is closed or said further switch means is in closed condition.

5. An auxiliary emergency warning system for a motor vehicle as claimed in claim 1 and further including electrical circuit means for supplying current to all said signaling lamps, said control means including means forming part of said circuit means comprising switch means to cause said lamps to produce at least said first, second and third signals and a manually operated, knob controlled cam shaft having can means thereon so operatively related with said switch means as to produce said signals as desired responsive to selective turning of said cam shaft.

* * * * *